Patented Dec. 17, 1929

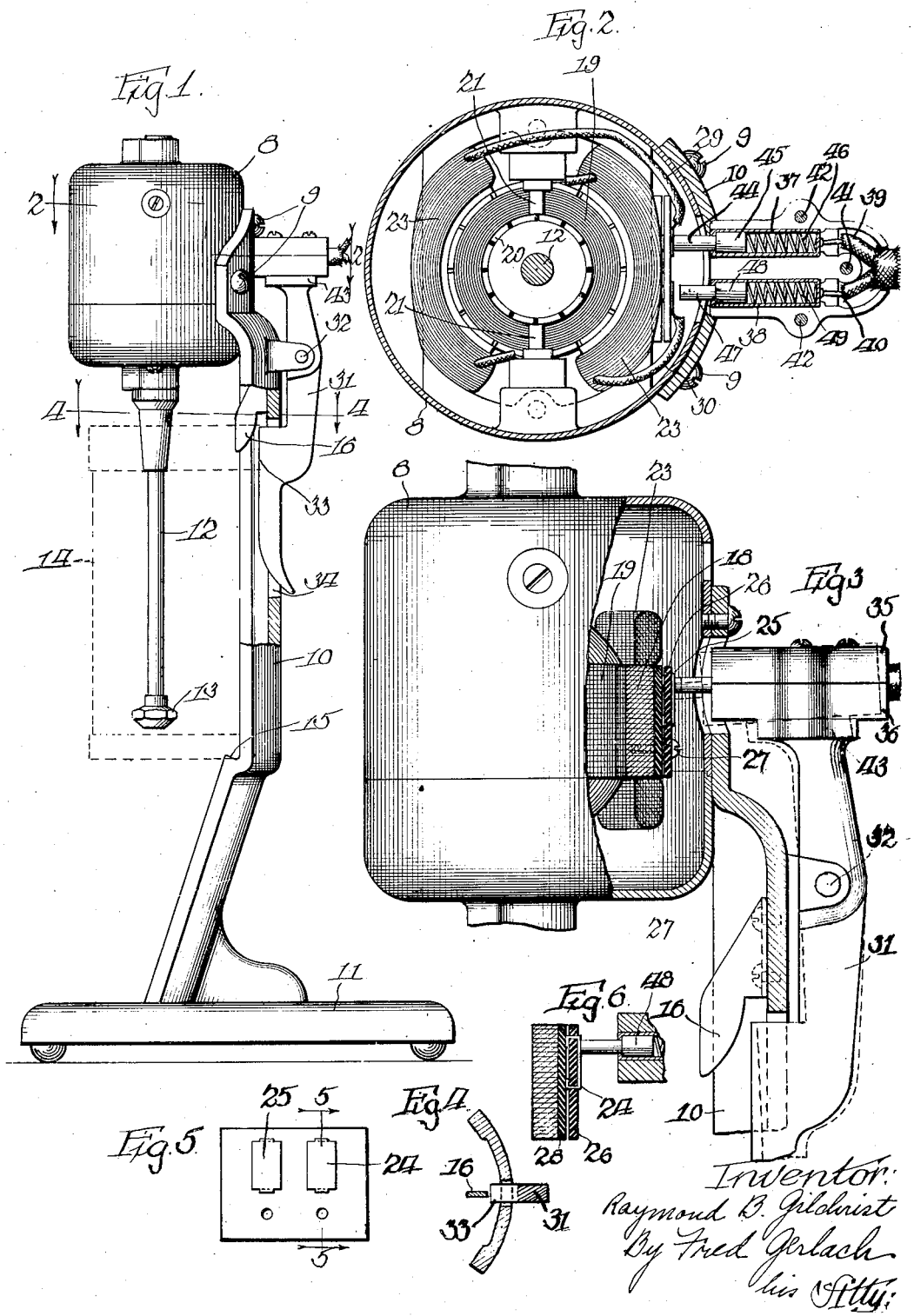

1,739,635

UNITED STATES PATENT OFFICE

RAYMOND B. GILCHRIST, OF NEWARK, NEW JERSEY, ASSIGNOR TO THE GILCHRIST COMPANY, OF NEWARK, NEW JERSEY, A CORPORATION OF NEW JERSEY

DRINK MIXER

Application filed February 8, 1923. Serial No. 617,661.

The invention relates to electric drink mixers. In the operation of drink mixers which include an electric motor, the service is interrupted whenever the motor becomes inoperative. In these mixers, as heretofore constructed, the electrical connections for supplying energy to the motor have been made so that it was usually necessary to send the entire mixer to the repair shop, because the ordinary user was not sufficiently skilled in making and separating electrical connections to separate the motor from the remainder of the mixer.

The object of the present invention is to provide an electric drink mixer which is constructed so that the motor may be removed from its support for replacement or repair without the necessity of disconnecting or cutting any of the electrical connections for supplying current to the motor. This object is attained by providing contacts in or removable with the motor as an entity and a cooperating switch-device which is adapted to contact with, but is otherwise disconnected from, the contacts, so that the motor and its contacts may be removed without cutting or disconnecting any of the wiring necessary to supply current to the motor. As a result, the user of a mixer, when a motor becomes inoperative or requires repairs, can readily remove it and replace it with another, so that there will be no interruption in the service of the mixer. It becomes feasible to keep available a spare motor for instantaneous replacement of the defective one whenever it is necessary or the user can procure and readily substitute a spare motor while the one removed is being repaired.

Other objects of the invention will appear from the specification.

The invention consists in the several novel features hereinafter set forth and more particularly defined by claims at the conclusion hereof.

In the drawings: Fig. 1 is a side elevation of a drink mixer embodying the invention, parts being shown in elevation. Fig. 2 is a horizontal section on line 2—2 of Fig. 1. Fig. 3 is a longitudinal section through a portion of the motor and its support. Fig. 4 is a section on line 4—4 of Fig. 1. Fig. 5 is a detail of the insulation carrying the contact plates in the motor. Fig. 6 is a section on line 6—6 of Fig. 2.

The invention is exemplified in a drink mixed of the one-hand type exhibited in an application, Serial No. 539,059 filed by me February 25, 1922, in which a casing 8 of an electric motor is secured by screws 9 to the upper end of a supporting standard 10 which is fixed on a base 11 which is adapted to rest on a table or counter. A shaft 12 is fixed to and depends from the rotor of the motor and carries, at its lower end, an agitator 13 which is adapted to mix the contents of a receptacle 14 which is adapted to be removably held in operative position around the agitator by an arcutate rest or support 15 for the bottom of the receptacle and a hook 16 adapted to engage the inner margin of the receptacle above the rest 15. Standard 10 serves as a guide for the receptacle while it is being manually placed into and out of its operative position. The means for holding the receptacle in its operative position may be of any suitable or well known construction and the specific automatic holding means shown forms no part of the present invention. For a more detailed description and illustration, reference may be had to the aforesaid application, Serial No. 539,059.

The motor casing carries bearings for the shaft 12 at its upper and lower end and is formed of upper and lower sections, as well understood in the art. The casing is secured to the upper portion of the standard 10 entirely by three screws 9, so that when these screws are removed, the entire motor with the shaft 12 and agitator 13 can be removed. The motor comprises a laminated field 18 which is fixedly secured in the motor casing, an armature 19 on shaft 12, a commutator 20 rotating with the armature, stationary brushes 21 mounted in the upper portion of the case and suitable field windings 23. These parts may be of any suitable construction, as well understood in the art. Contact plates 24 and 25 are clinched to a plate 26 of insulation. Screws 27 extend through insulating plate 26 and into the field 18, an insulating strip 28 being interposed between plate 26 and the laminated field to insulate the field from contacts 24, 25. Plates 24 and 25 are connected by conductors 29 and 30 respectively to the field windings which are in turn connected to the brushes in manner well understood in the art. Contacts 24 and 25 are mounted in the motor casing, so that they will be removable with the motor as an entity and so that the motor may be removed without disconnecting any wiring.

A lever 31 is pivoted to the standard 10 at 32 and has a portion 33 extending through a slot 34 in the standard and positioned in the path of movement of the receptacle 14 in its placement into operative position so that the lower end of the lever will be moved backwardly and its upper end forwardly while the receptacle is being manually placed into its operative position. The lever is also held in its shifted position by the receptacle while the latter is in its operative position. Shift of the lever by the receptacle automatically controls the operation of the motor through a switch which is mounted at the upper end of the lever and is adapted to establish electrical connections to supply current to the motor. This switch consists of a box of insulating material formed of sections 35 and 36 containing a pair of sockets 37 and 38, to which are respectively connected conductors 39 and 40 from the current supply. These sockets are fixedly held in and between the sections of the box. The sections are secured together by a screw 41 and screws 42 pass through the box sections and secure them conjointly to the upper end of lever 31 which is provided with a lug 43 for this purpose. A contact pin 44, provided with a head 45 which is slidable in socket 37, is acted upon by a spring 46 and is adapted to remain in constant contact with contact-plate 24 in the motor. A pin 47 with a head 48 is slidable in socket 38 and is acted upon by a spring 49 to yieldingly press said pin outwardly. Pin 47 is adapted to engage contact plate 25 to complete the circuit for the operation of the motor and is normally separated therefrom to keep the circuit interrupted until lever 31 is shifted by the receptacle.

The operation of the improved mixer will be as follows: Upon placement of the receptacle 14 onto rest 15 and into hook 16, it will engage lever 31 and swing the switch-box 35, 36 inwardly to cause spring-pressed contact-pin 47 to engage contact-plate 25 in the motor so that a circuit will be completed as follows: conductor 40, socket 38, pin 47, plate 25, conductor 30, and the windings of the motor, as well understood in the art, conductor 29, plate 24, contact pin 44, socket 37 and conductor 39. Upon removal of the receptacle 14, spring 46 will restore lever 31 to its normal position and cause the circuit to be interrupted between contact-plate 25 and pin 47.

When a repair is to be made to the motor, the user can remove it as an entity by removing screws 9 without any change in the wiring for supplying current to the motor, because the motor is separable from the switch and the current is supplied through the contact pins of the switch. This makes it possible for the user to quickly substitute a spare motor whenever a repair in the motor is necessary.

The invention exemplifies an electrically driven drink mixer, in which provision is made for supplying current to the motor without wiring which requires disconnection in removing the motor. The force of one of the springs for the contact pins is utilized to retract the receptacle operated switch-lever. A characteristic of the operation of the switch is that the lever is pivoted to cause the contact pins 44, 47 to slide slightly over the contact plates to insure a good connection.

The drink mixer as an entirety is simple in construction and its construction is such that motors can be assembled into the structure by unskilled labor.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an electric drink mixer, the combination of a support, and electric motor secured to said support and adapted for driving a downwardly extending agitator, terminal-contacts carried by the motor, direct electric connections between said contacts and the field windings of the motor, a movable switch carried by the support for controlling the operation of the motor comprising members to engage said terminal contacts and separable therefrom, and supply conductors from a source of energy leading directly to the switch-members respectively, the motor and its contents being removable from the support by separation at the switch members.

2. In an electric drink mixer, the combination of a support, an electric motor removably secured to said support and adapted for driving a downwardly extending agitator, terminal contacts carried by the motor, direct electric connections between said contacts and the field windings of the motor, a movable switch carried by the support for controlling the operation of the motor comprising members to engage said terminal contacts and separable therefrom and conductors from a source of energy leading directly to the switch-members respectively and independently of the motor, the motor and its terminal contacts being conjointly removable from the support by separation at the switch-members.

3. In an electric drink-mixer, the combination of a support, an electric motor removably secured to said support and adapted for driving a downwardly extending agitator, terminal contacts carried by the motor, direct electric connections between said contacts and the field windings of the motor, a movable switch carried by the support for controlling the operation of the motor comprising members to contact with said terminal contacts and separable therefrom and conductors from a source of energy leading directly to the switch-members respectively, the motor and its terminal-contacts being conjointly removable from the support by separation at the switch and without disconnecting the conductors from the switch.

4. In an electric drink-mixer, the combination of a support, an electric motor secured to said support and adapted for driving a downwardly extending agitator, terminal-contacts carried by the motor, direct electric connections between said contacts and the field windings of the motor, a movable switch for controlling the motor provided with contact-members for engaging said terminal-contacts and separable therefrom, and electrical conductors from a source of energy leading directly to said members respectively, the motor being connected to the conductors only through the contacts and switch.

5. In an electric drink-mixer, the combination of a support, an electric motor removably secured to said support and adapted for driving a downwardly extending agitator, terminal contacts carried by the motor, direct electric connections between said contacts and the field windings of the motor, a movable switch for controlling the motor provided with contact-members for engaging said terminal contacts and separable therefrom, and electrical conductors from a source of energy leading directly to said members respectively, the motor and its terminal contacts being conjointly removable from the support without disconnecting the conductors from the switch.

6. In an electric drink-mixer, the combination of a support, an electric motor removably secured to said support and adapted for driving a downwardly extending agitator, terminal-contacts carried by the motor, direct electric connections between said contacts and the field windings of the motor, a pivoted lever, a switch for controlling the motor carried by and movable with the lever and provided with contact-members for engaging said terminal contacts respectively and separable therefrom, and electrical conductors from a source of energy leading directly to said members respectively.

7. In an electric drink-mixer, the combination of a support, an electric motor removably secured to said support and adapted for driving a downwardly extending agitator, terminal contacts carried by the motor, direct electric connections between said contacts and the field windings of the motor, a pivoted lever, a switch for controlling the motor carried by and movable with the lever and provided with contact-members for engaging said terminal contacts respectively and separable therefrom, and electrical conductors from a source of energy leading directly to said members, the motor and its terminal contacts being removable from the support independently of the lever and switch.

8. In an electric drink-mixer, the combination of a support, an electric motor secured to said support and adapted for driving a downwardly extending agitator, terminal-contacts carried by the motor, direct electric connections between said contacts and the field windings of the motor, a movable switch for controlling the motor provided with contact-members for engaging said terminal-contacts and separable therefrom, and electrical conductors adapted to be connected to a source of energy and leading directly to said members respectively, for supplying current to the motor through said members and said terminal-contacts.

9. In an electric drink-mixer, the combination of a support, an electric motor removably secured to said support and adapted for driving a downwardly extending agitator, terminal contacts carried by the motor, direct electric connections between said contacts and the field windings of the motor, a movable switch provided with contact-members for engaging said terminal contacts respectively and separable therefrom, and electrical conductors adapted to be connected to a source of energy and leading directly to said members, for supplying current to the motor through said members and said terminal-contacts, the motor and its terminal contacts being removable from the support without disconnecting the electrical conductors from the switch.

10. In an electric drink-mixer, the combination of a support, an electric motor removably secured to said support and adapted for driving a downwardly extending agitator, terminal contacts carried by the motor, direct electric connections between said contacts and the field windings of the motor, a pivoted lever, a switch for controlling the motor carried by and movable with the lever and provided with contact-members for engaging said terminal contacts and separable therefrom respectively, and electrical conductors adapted to be connected to a source of energy and leading directly to said members, for supplying current to the motor through said members and said terminal contacts.

11. In an electric drink-mixer, the combination of a support, an electric motor secured to said support and adapted for driving a downwardly extending agitator, means for controlling the operation of the motor comprising terminal-contacts, and a switch having members for engaging the contacts respectively, a spring for shifting one of said members, and movable means for operating the switch, adapted to be retracted by said member shifting spring to open the switch.

12. In an electric drink-mixer, the combination of a support, an electric-motor secured to said support and adapted for driving a downwardly extending agitator, means for controlling the operation of the motor comprising terminal contacts and a switch having members for engaging the contacts respectively, a spring applied to shift one of said members, and a lever for operating the switch, adapted to be retracted by the spring to open the switch.

13. In an electric drink mixer, the combination of a support, an electric motor secured to said support and adapted for driving a downwardly extending agitator, means for controlling the operation of the motor comprising terminal contacts and a switch provided with contact-members for engaging the terminal-contacts respectively, springs applied to permit the members to yield when engaging the contacts, and means for operating the switch, adapted to be retracted by one of the springs to open the switch.

14. In an electric drink mixer, the combination of a support, an electric motor secured to said support and adapted for driving a downwardly extending agitator, means for controlling the operation of the motor comprising terminal-contacts and a switch provided with spring-pressed members for engaging said contacts respectively, and means for operating the switch, one of said members being adapted to remain in engagement with a contact and to retract the operating means, to open the switch.

15. In an electric drink mixer, the combination of a support, an electric motor secured to said support and adapted for driving a downwardly extending agitator, means for controlling the operation of the motor comprising a pair of terminal contacts secured in the motor, and a switch provided with spring-pressed members for engaging said contacts respectively, and a lever on which the switch is mounted for operating the switch, one of said members being adapted to remain in engagement with one of the contacts and to retract the lever and stop the motor.

16. In an electric drink mixer, the combination of a support, an electric motor secured to said support and adapted for driving a downwardly extending agitator, means for controlling the operation of the motor comprising a pair of terminal contact-plates in the motor and a switch provided with spring-pressed pins for engaging said contacts respectively, and a lever on which the switch is mounted and for operating the switch, one of said pins being adapted to remain in engagement with one of the contacts, to retract the lever and stop the motor.

17. In a drink mixer, the combination with a standard and an electric motor supported at its upper end, of a drink mixing receptacle adapted to be placed in operative position below said motor, and switch mechanism for said motor comprising substantially fixed contacts in the motor housing and a contact adapted to be actuated by the placing of said receptacle in operative position.

18. A drink mixer, comprising a support, an electric motor carried thereby and having a mixing instrumentality, a container, and a switch means within the casing of the motor and having a portion projecting from the casing into the path of movement of the upper edge portion of the container when moving said container to a mixing position.

19. A drink mixer, comprising a support, an electric motor carried thereby and having a downwardly extending mixing instrumentality, a container, and a switch means within the casing of the motor and normally in off position and having a portion projecting yieldingly from the casing and into the path of upward movement of the upper edge portion of the container when moving said container to its mixing position to move the switch to on position.

20. A drink mixer comprising a support, an electric motor carried thereby and having a downwardly extending mixing intrumentality, a container into which the instrumentality extends, a switch means within the casing of the motor and having a projecting portion which is yieldingly held in the on position by the upper edge portion of the container, and means for moving the projecting portion to an off position when the container is removed from its mixing position.

21. In a drink mixer, the combination with a standard and an electric motor supported at its upper end and adapted to operate a downwardly extending mixing instrumentality, of a drink mixing receptacle adapted to be placed in operative position below said motor, and switch mechanism comprising a stationary contact embodied in the motor housing and a movable contact engaging the switch and adapted to be actuated to close the motor circuit by the placing of the receptacle in operative position.

22. In a drink mixer, the combination of a support with an electric motor carried thereby and having a casing, a mixing instrumentality adapted to be actuated by said motor, a switch for said motor in said casing, a container, and means projecting from said casing for actuating said switch to closed position by engagement with a part on said container when moving said container to a mixing position.

23. In a drink mixer, a support, an electric motor carried thereby and having a downwardly extending mixing instrumentality, a container into which said instrumtality extends, a casing for said motor, switch means in said motor casing, resilient means for biasing said switch to open position, and mechanism for actuating said switch to closed position, including a downwardly extending part projecting from said casing and engaged by an upper part on said container to close said switch when said container is moved into a mixing position.

Signed at Chicago, Illinois, this 23rd day of January, 1923.

RAYMOND B. GILCHRIST.